(12) United States Patent
Shaw et al.

(10) Patent No.: US 9,824,333 B2
(45) Date of Patent: Nov. 21, 2017

(54) COLLABORATIVE MANAGEMENT OF ACTIVITIES OCCURRING DURING THE LIFECYCLE OF A MEETING

(75) Inventors: Donna Sue Shaw, Andover, MA (US); Gregory Scott Klabish, Malden, MA (US); Gail Elaine Slapikoff, Chelmsford, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1637 days.

(21) Appl. No.: 12/039,789

(22) Filed: Feb. 29, 2008

(65) Prior Publication Data
US 2009/0222741 A1 Sep. 3, 2009

(51) Int. Cl.
*G06F 3/048* (2013.01)
*G06Q 10/10* (2012.01)

(52) U.S. Cl.
CPC ................... *G06Q 10/109* (2013.01)

(58) Field of Classification Search
CPC .... G06Q 10/109; G06Q 10/10; G06Q 10/101; G06Q 10/063116; G06Q 10/1095
See application file for complete search history.

(56) References Cited

U.S. PATENT DOCUMENTS

| | | | |
|---|---|---|---|
| 5,317,683 A | 5/1994 | Hager et al. | |
| 7,974,871 B2 * | 7/2011 | Oral et al. | 705/7.13 |
| 2005/0027800 A1 | 2/2005 | Erickson et al. | |
| 2005/0125246 A1 | 6/2005 | Muller et al. | |
| 2005/0131714 A1 * | 6/2005 | Braunstein et al. | 705/1 |
| 2006/0224430 A1 * | 10/2006 | Butt | 705/8 |
| 2007/0011233 A1 | 1/2007 | Manion et al. | |
| 2007/0033091 A1 | 2/2007 | Ravikumar et al. | |
| 2008/0162244 A1 * | 7/2008 | Oral et al. | 705/9 |
| 2009/0204465 A1 * | 8/2009 | Pradhan | 705/9 |
| 2009/0234721 A1 * | 9/2009 | Bigelow et al. | 705/12 |

OTHER PUBLICATIONS

"Microsoft Office Groove 2007", pp. 3.
Yankelovich, et al., "Meeting Central: Making Distributed Meetings More Effective", Published in the 2004 conference on Computer Supported Cooperative Work Nov. 6-10, 2004, Sun Microsystems Inc., 2004, pp. 10.
Sen, "An Automated Distributed Meeting Scheduler", Accepted for Publication in IEEE Expert, 1996, pp. 1-13.
"FileMaker Meetings 2.0", FileMaker Inc., 1994-2007, pp. 1-3.

* cited by examiner

*Primary Examiner* — Namitha Pillai
(74) *Attorney, Agent, or Firm* — Liangip, PLLC

(57) ABSTRACT

Technologies are described herein for collaborative management of activities occurring during the lifecycle of a meeting. A collaboration program includes functionality for collaborative management of activities occurring during the entire lifecycle of a meeting. Using the collaboration program, meeting participants can collaborate on the creation of a meeting agenda prior to the occurrence of a meeting, can independently take and exchange meeting notes during a meeting, and can collaboratively generate a meeting summary following the meeting. The meeting agenda, meeting notes, and meeting summaries can be synchronized to a shared workspace accessible to each of the meeting participants through the collaboration program.

19 Claims, 12 Drawing Sheets

COLLABORATIVE MANAGEMENT OF ACTIVITIES OCCURRING DURING THE LIFECYCLE OF A MEETING

BACKGROUND

Many types of software tools exist that allow for the scheduling of meetings. For instance, many personal information manager programs provide calendaring functionality. Through this functionality, a user can create meetings on a calendar, invite other users to the meeting, and schedule time on the calendars of the other users for the meeting. Meeting invitees can accept, decline, or suggest a new time for the meeting.

While current software tools provide a great deal of functionality for scheduling meetings, these tools provide little if any functionality for managing activities that occur during the entire lifecycle of a meeting. The lifecycle of a meeting refers to the time prior to the meeting, during the meeting, and after the meeting. For instance, using current software tools, a user may create a meeting agenda prior to a meeting that identifies one or more topics for the meeting. During the meeting, one or more users may take notes on the meeting. After the meeting, one or more users may create a summary of the meeting. Current software tools provide little if any functionality for managing these activities.

Using current software tools, activities that occur during the lifecycle of a meeting are commonly performed independently by each of the meeting participants. This can result in significant duplication of effort by the meeting participants. For instance, two meeting participants may independently create an agenda or a summary for a meeting. Moreover, in order to collaborate on these activities, it is often necessary for the meeting participants to utilize electronic mail ("e-mail") or another type of communication to transmit documents reflecting the meeting activities. For instance, a meeting participant may create a meeting agenda and e-mail the agenda to the other participants. The other participants may then modify the agenda and e-mail the modifications. This process can lead to large numbers of e-mail messages, to difficulty in incorporating the changes made by each participant, and even to confusion in identifying the most current version of a document. There is also currently no convenient way to store documents reflecting the activities occurring during the lifecycle of a meeting in a common location that is convenient for all meeting participants to access.

It is with respect to these considerations and others that the disclosure made herein is presented.

SUMMARY

Technologies are described herein for collaborative management of activities occurring during the lifecycle of a meeting. In particular, a collaboration program is described herein that includes functionality for collaborative management of activities occurring during the entire lifecycle of a meeting. For instance, in one embodiment, meeting participants can collaborate on the creation of a meeting agenda prior to the occurrence of a meeting, can independently take and exchange meeting notes during a meeting, and can collaboratively generate a meeting summary following the meeting. Through the use of synchronization functionality provided by the collaboration program, the meeting agenda, meeting notes, and meeting summaries are synchronized to a shared workspace accessible to each of the meeting participants.

According to one aspect presented herein, a collaboration program is provided that includes functionality for storing documents and other content in a shared workspace. A shared workspace is a local or distributed storage location for storing documents and other content. Through the collaboration program, the documents and other content in a shared workspace are made available to groups of users of the collaboration program for viewing and modification. For instance, a group of users may collectively utilize a shared workspace to collaborate on a project. The collaboration program also includes functionality for synchronizing changes made to documents or other content stored within the shared workspace to all of the members of a group.

According to other aspects, the collaboration program includes functionality for collaborative management of activities occurring during the lifecycle of a meeting. For instance, in one embodiment, the collaboration program includes functionality for scheduling a meeting with other users of the collaboration program (referred to herein as "meeting participants"). Once a meeting has been scheduled, activities occurring prior to the meeting can be collaboratively managed through the use of functionality provided by the collaboration program. As an example, the collaboration program may provide a user interface and associated functionality for collaboratively creating an agenda for the meeting. The agenda may include one or more meeting items, and meeting participants may be permitted to create agenda items, edit agenda items, and delete agenda items. A presenter may also be assigned for each agenda item and the agenda items may also be placed in a desired order. Documents or other types of attachments may also be added to the agenda items. Once the agenda has been created, it may be synchronized to a shared workspace, thereby making it available to all of the meeting participants for viewing and modification.

According to other aspects, the collaboration program also provides a user interface and associated functionality for managing activities that occur during a meeting. For instance, in one implementation, the collaboration program provides functionality for allowing meeting participants to take notes related to the meeting. Functionality may also be provided for adding an agenda for the meeting to the meeting notes. Once the notes have been created, they may also be stored in the shared workspace for access and use by other authorized users of the collaboration program.

According to other aspects, the collaboration program also provides a user interface and associated functionality for managing activities that occur following a meeting. For instance, in one embodiment the collaboration program provides functionality for creating a summary that includes information that summarizes the meeting. The meeting agenda and notes created by any of the meeting participants may be added to the summary. Once the summary has been created, it may be stored in the shared workspace for access and use by the meeting participants and other authorized users of the collaboration program that did not participate in the meeting. The summary may also be transmitted to other users, including users who are not members of the workspace or who did not participate in the meeting, via e-mail or another communication mechanism.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
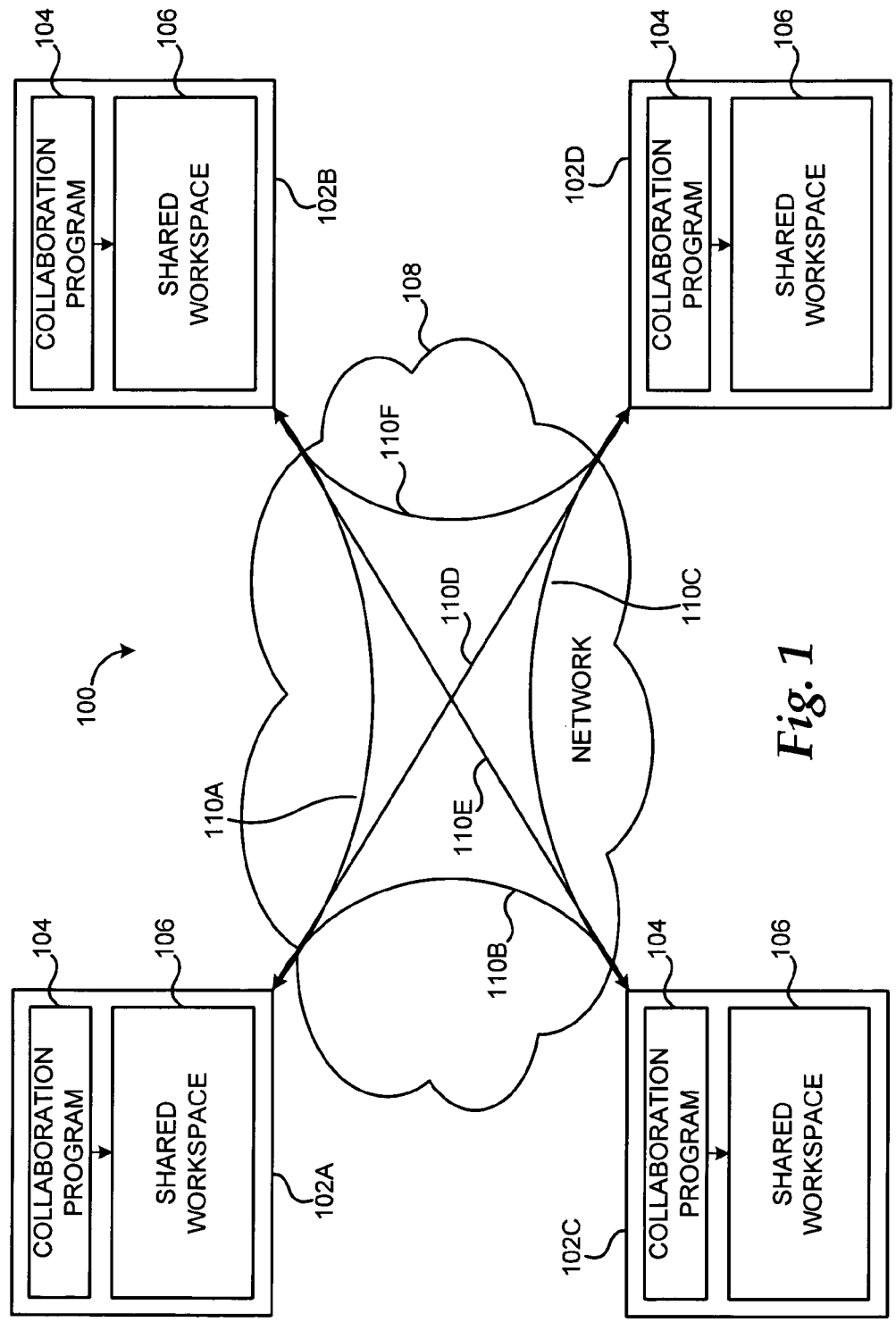
FIG. 1 is a network diagram showing aspects of an illustrative operating environment and several software components provided by the embodiments presented herein.

Technologies are described herein for collaborative management of activities occurring during the lifecycle of a meeting. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of technologies for collaborative management of activities occurring during the lifecycle of a meeting will be described.

Turning now to FIG. 1, details will be provided regarding an illustrative operating environment and several software components provided by the embodiments presented herein. In particular, FIG. 1 shows aspects of a system 100 for facilitating collaboration and communication among members of small groups. The system 100 illustrated in FIG. 1 includes several computers 102A-102D that are connected to one another via a network 108. In particular, each of the computers 102A-102D may communicate with one another directly through the connections 110A-110F. It should be appreciated that although the computers 102A-102D are described herein as being standard desktop computer systems, other types of computer devices may be utilized. For instance, communication appliances and other types of communication devices, including handheld and wireless devices may be utilized. Similarly, although the network 108 is described herein as being the Internet, virtually any other type of local area network, wide area network, or wireless network may be utilized to facilitate the communication described herein.

As also illustrated in FIG. 1, each of the computers 102A-102D is configured to execute a collaboration program 104. The collaboration program 104 is an executable computer program designed to facilitate collaboration and communication among members of small groups. Through the use of the collaboration program 104, a shared workspace 106 can be created. As will be described in greater detail below, the shared workspace 106 may be utilized to store documents, content, and other information and to share this information among users of the computers 102A-102D. For instance, a user of the computer 102A may create the shared workspace 106 through the collaboration program 104. The user of computer 102A may then invite users of the computers 102B-102D to join the shared workspace 106. Each user that responds to an invitation to become an active member of the shared workspace 106 is sent a copy of the workspace 106 that is installed onto their respective computers 102B-102D.

According to embodiments, all of the data that is transmitted between the computers 102A-102D to synchronize the contents of the shared workspace is encrypted. The shared workspace 106 may also be encrypted on the mass storage device of the computers 102A-102D. It should be appreciated that by storing a local copy of the shared workspace on each of the computers 102A-102D, users of the computers 102A-102D are never disconnected from the shared data. For instance, in one embodiment one of the computers 102A-102D may comprise a portable computer system. In this embodiment, if the portable computer system is taken offline from the network 108, the shared workspace 106 will remain on the portable computer system for access by the user. Any modifications to the shared workspace 106 while the portable computer system is offline will be synchronized to the other computers when the portable computer is returned to the online state. In this manner, the collaboration program 104 ensures that the shared workspace 106 stored in each of the computers 102A-102D are continually synchronized so that each member of the shared workspace 106 has access to the same data as the other members.

According to embodiments, the changed data in a shared workspace 106 is transmitted to the other computers by transmitting only the changes to the shared workspace 106. One methodology for transmitting only the changes to a shared workspace is described in U.S. Patent Publication No. US2007/0255787 entitled "Method and Apparatus for Maintaining Consistency of the Shared Space Across Multiple Endpoints in a Peer-to-Peer Collaborative Computer System", which was filed on Jun. 22, 2007, is assigned to the assignee of the instant patent application, and which is expressly incorporated herein by reference in its entirety.

As discussed briefly above, when any one member of a shared workspace 106 makes a change to the shared workspace 106, that change is sent to all of the other members. If a member is offline and not connected to the network 108 at the time the change is made, the change is queued and synchronized to other workspace members. When the offline member comes back online, that user's copy of the shared workspace 106 is updated. It should be appreciated that although the topology illustrated in FIG. 1 is a peer-to-peer topology, other embodiments may be utilized that include a server computer that assists in the synchronization of the shared workspace 106 between the computers 102A-102D. It should also be appreciated that while in one implementation the collaboration program 104 comprises the GROOVE collaboration program from MICROSOFT CORPORATION of Redmond, Wash., other collaboration programs from other vendors may be utilized to implement the concepts and technologies presented herein.

As will be described in greater detail below, the collaboration program 104 also includes functionality for enabling geographically distributed individuals and/or cross organizational individuals the ability to participate in the full lifecycle of a meeting. In this regard, the collaboration program 104 provides capabilities for meeting setup, scheduling and preparation, collaboration, creation, distribution, and organization of an agenda for a meeting, capabilities for interfacing real-time desktop sharing tools during a meeting, allowing the multi-participant creation of meeting notes, and functionality for creating a meeting summary and distributing the summary to others. Additional details regarding this functionality will be provided below with respect to FIGS. 2-9.

Figure 2:
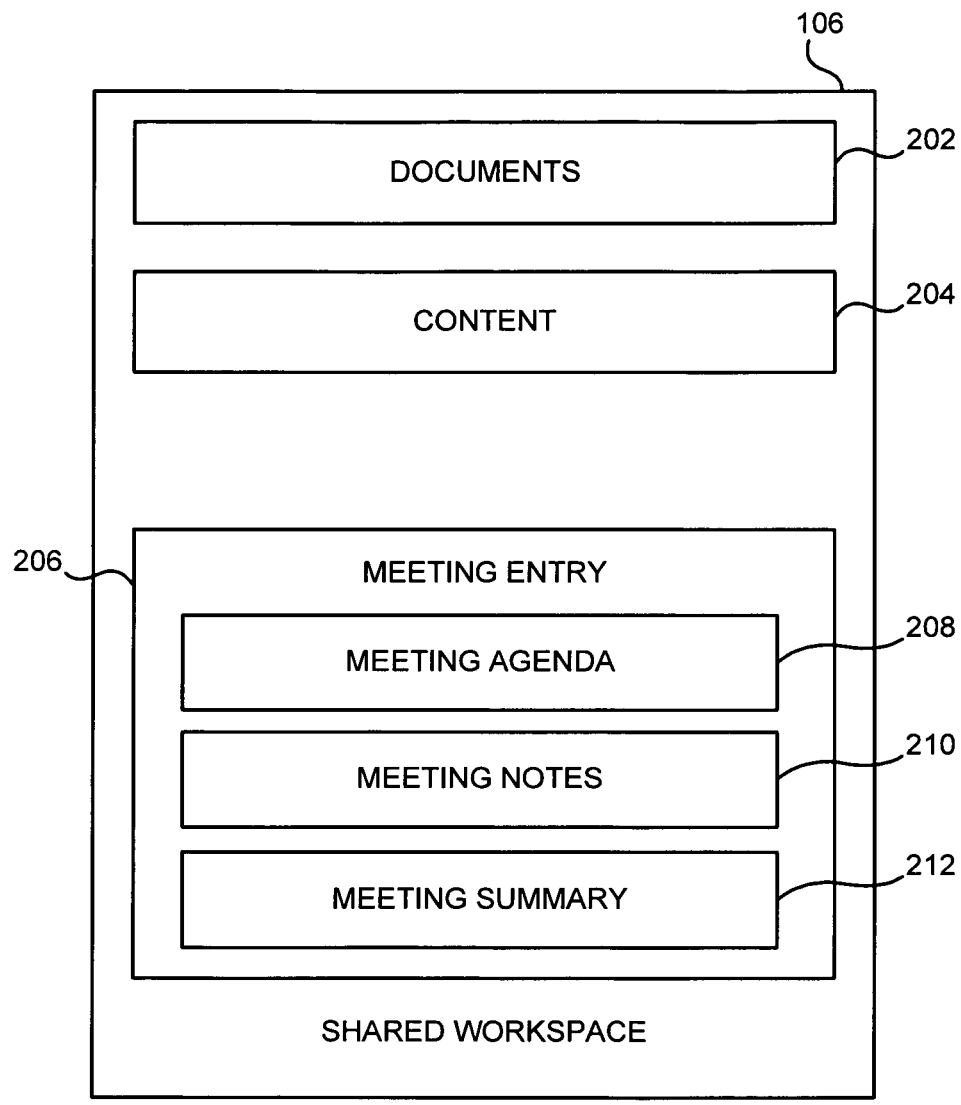
FIG. 2 is a software architecture diagram showing aspects of a shared workspace utilized in embodiments presented herein.

Referring now to FIG. 2, additional details regarding the shared workspace 106 will be described. As mentioned briefly above, the shared workspace 106 is a local or distributed storage location for storing documents 202 and other content 204. As used herein, the term document refers to files associated with textual and/or graphics data, such as word processing documents, spreadsheet documents, and the like. Content refers to any form of data that can be a part of a shared workspace 106, including audio data, video data, images, graphics, and so on. It should be understood that the terms content and document may be used interchangeably herein, and that any type of data may be stored within the shared workspace 106 and synchronized among the members of the shared workspace 106.

As also discussed briefly above, the collaboration program 104 includes functionality for scheduling and holding meetings. In this regard, the collaboration program 104 includes calendaring functionality for scheduling meetings with other users of the collaboration program 104. This calendaring functionality may be utilized to schedule a meeting at a time when the requested meeting participants are available for such a meeting. When a meeting is created within the collaboration program 104, a meeting entry 206 is created within the shared workspace 106. As shown in FIG. 2, the meeting entry 206 may include a meeting agenda 208, meeting notes 210, and one or more meeting summaries 212. As will be discussed in greater detail below, the meeting agenda 208 includes a number of agenda items identifying the speakers and other information about the format of the meeting. The meeting notes 210 include text and other information, such as meeting minutes, that relate to the meeting. The meeting summary 212 includes a summary of the meeting and is typically generated following the meeting.

As will be described in greater detail below, when a meeting entry 206 is created by the collaboration program 104, the meeting entry 206 is synchronized to each of the members of the shared workspace 106. The other members of the shared workspace 106 may then utilize the collaboration program 104 to modify the meeting agenda 208, the meeting notes 210, or the meeting summary 212. These subsequent changes are then synchronized to the other members of the shared workspace 106. Additional details regarding the functionality provided by the collaboration program 104 for creating and managing the meeting agenda 208, the meeting notes 210, and the meeting summary 212 are provided below with respect to FIGS. 3-9.

Figure 3:
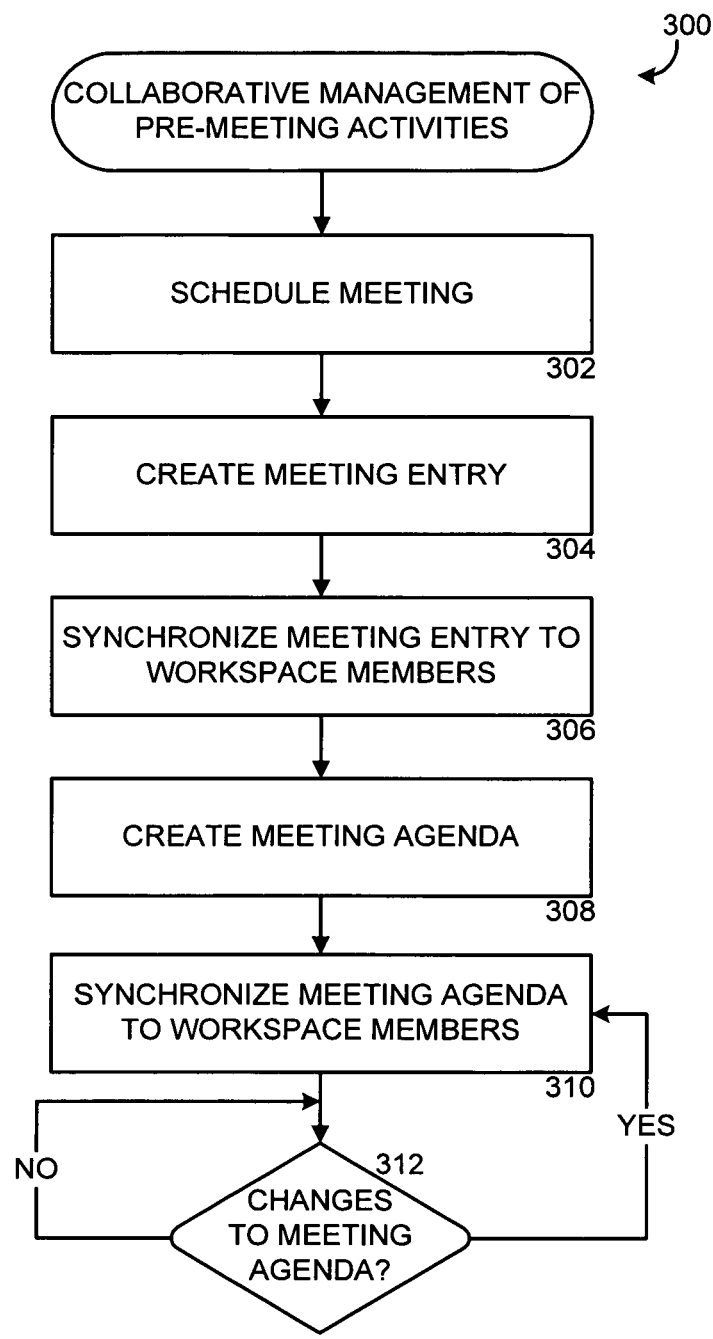
FIG. 3 is a flow diagram showing an illustrative routine for the collaborative management of pre-meeting activities according to one embodiment presented herein.

Referring now to FIG. 3, additional details will be provided regarding the embodiments presented herein for collaborative management of activities occurring during the lifecycle of a meeting. In particular, FIG. 3 is a flow diagram showing an illustrative routine for the collaborative management of pre-meeting activities according to one embodiment presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in a different order than those described herein.

The routine 300 begins at operation 302, where the collaboration program 104 is utilized to schedule a meeting. As discussed above, the collaboration program 104 provides shared calendaring functionality for scheduling a meeting among members of the shared workspace 106. Any member of the shared workspace 106 can create a meeting in the calendar provided by the collaboration program 104. In this regard, a user may be presented with a user interface form allowing entry of the meeting subject, location, date, and time, including time zone information. The user may also be permitted to indicate that the meeting reoccurs on a specified schedule. In one embodiment, the collaboration program 104 operates in conjunction with a personal information manager program to provide the calendaring functionality described above.

Once the collaboration program 104 has been utilized to create a meeting, all members of the shared workspace 106 may be permitted to contribute to the multiple phases of the meeting whether they are online or offline. Details regarding participation by members of the shared workspace 106 in pre-meeting activities are described with respect to FIG. 3. Activities performed during a meeting are described below with respect to FIG. 5, and activities occurring following a meeting are described below with respect to FIG. 7. It should be appreciated that users may contribute meeting data prior to the meeting, during a meeting, and after a meeting both synchronously and asynchronously, and such data is synchronized to other members of the shared workspace 106.

Once a meeting has been scheduled, the routine 300 continues from operation 302 to operation 304, where the meeting entry 206 is created. Once the meeting entry 206 has been created, the routine 300 continues from operation 304 to operation 306, where the collaboration program 104 synchronizes the meeting entry 206 to the other members of the shared workspace 106. It should be appreciated that any member of the shared workspace 106 may modify the meeting entry 206.

From operation 306, the routine 300 continues to operation 308 where a user may utilize the collaboration program 104 to create a meeting agenda 208. As discussed briefly above, a meeting agenda provides a schedule for the meeting and may include one or more meeting items that identify a presenter, a topic to be presented, and any associated details. Supporting data in the form of file attachments may also be attached to agenda items. Members of the shared workspace 106 can view and modify the agenda items created by other members and reorder the agenda items to fit into the desired flow of the meeting. An illustrative user interface for creating the meeting agenda 208 and the agenda items is discussed below with reference to FIGS. 4A-4B.

Once the meeting agenda 208 has been created, the meeting agenda 208 is synchronized to the other members of the shared workspace 106 at operation 310. The routine 300 then continues to operation 312 where a determination is made as to whether any changes have been made to the meeting agenda 208. If changes have been made to the meeting agenda 208, these changes are synchronized to other members of the shared workspace 106 at operation 310. As discussed above, if any members of the shared workspace 106 are offline, changes to the meeting agenda 208 will be synchronized when they return to an online state. It should be appreciated that changes may also be made to the meeting entry 206 and synchronized to the other members of the workspace. For instance, the subject, location, description, start date, end date, and recurrence information contained in the meeting entry 206 may be modified and synchronized to members of the shared workspace 106.

Figure 4A:
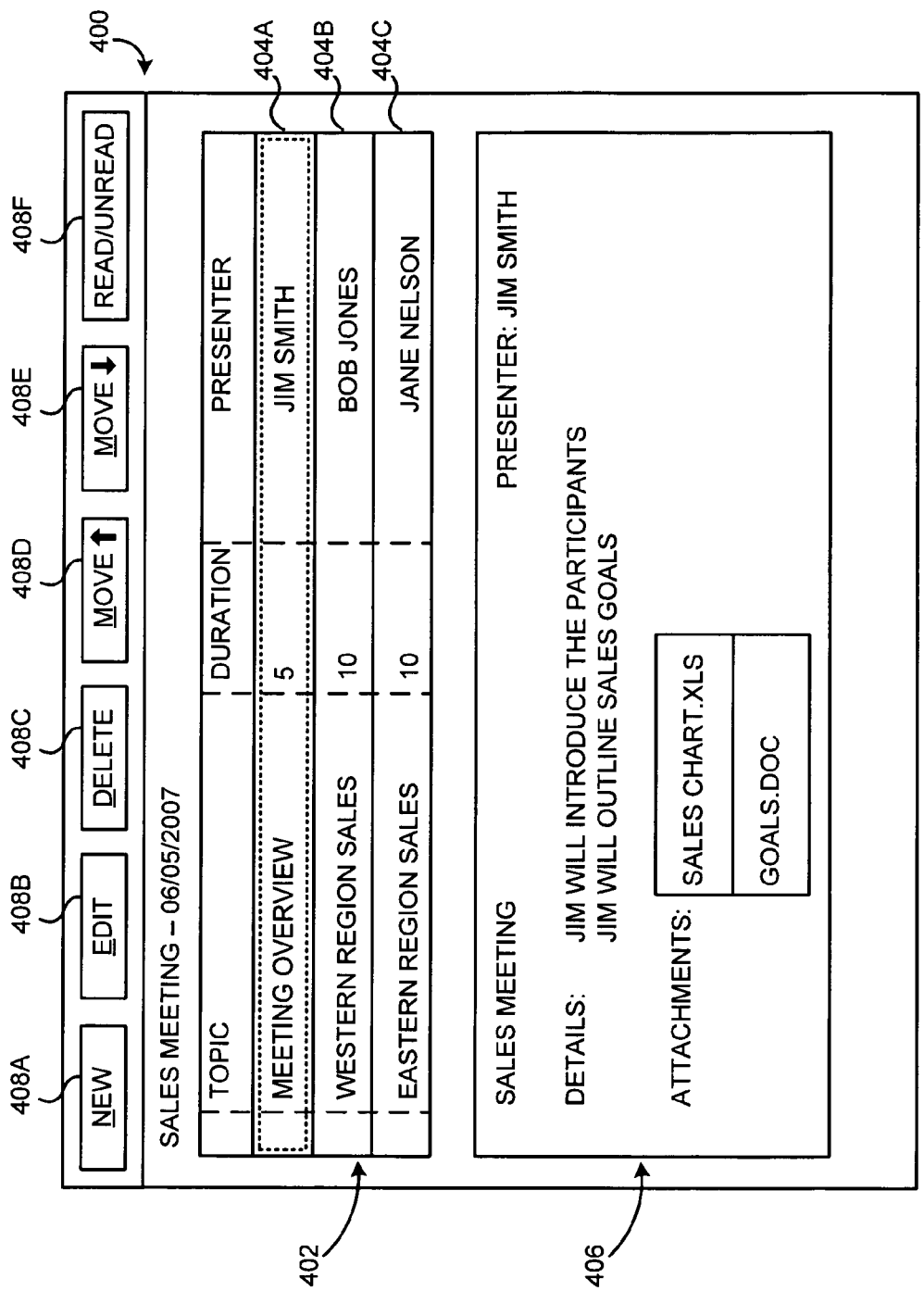
FIGS. 4A-4B are user interface diagrams showing several illustrative user interfaces provided herein in embodiments for collaboratively creating and managing a meeting agenda.

Turning now to FIG. 4A, an illustrative user interface 400 provided by the collaboration program 104 for creating a meeting agenda 208 will be described. As shown in FIG. 4A, the user interface 400 includes an agenda items pane 402 and an agenda item detail pane 406. The agenda items pane 402 shows a number of agenda items 404A-404C. For each of the agenda items 404A-404C, a meeting topic, the duration that the presenter will spend on the topic, and the name of the presenter are identified.

The user interface button 408A may be utilized to create a new agenda item 404. Additional details regarding the creation of a new agenda item will be provided below with respect to FIG. 4B. The user interface control 408B may be used to edit one of the agenda items 404A-404C, the user interface control 408C may be used to delete one of the agenda items 404A-404C, and the user interface controls 408D-408E may be utilized to modify the order of the agenda items 404A-404C. The user interface control 408F may be utilized to mark the agenda items 404A-404C as having been read or unread.

The agenda item detail pane 406 shows the details for a selected one of the agenda items 404A-404C. In the example shown in FIG. 4A, the agenda item 404A has been selected thereby, showing details of this agenda item in the agenda item detail pane 406. For instance, in the example shown in FIG. 4A, the agenda item detail pane 406 shows that the presenter is named Jim Smith, the details of the meeting, and any attachments that have been added to the agenda item 404A. As discussed above, documents and other types of content may be added to an agenda item 404. Selection of another one of the agenda items 404A-404C will cause the details for the selected agenda item to be displayed in the agenda item detail pane 406. It should be appreciated that the user interface shown in FIG. 4A is merely illustrative and that other types of user interfaces, user interfaces controls, and information regarding a meeting agenda 208 and agenda items may be displayed.

Figure 4B:
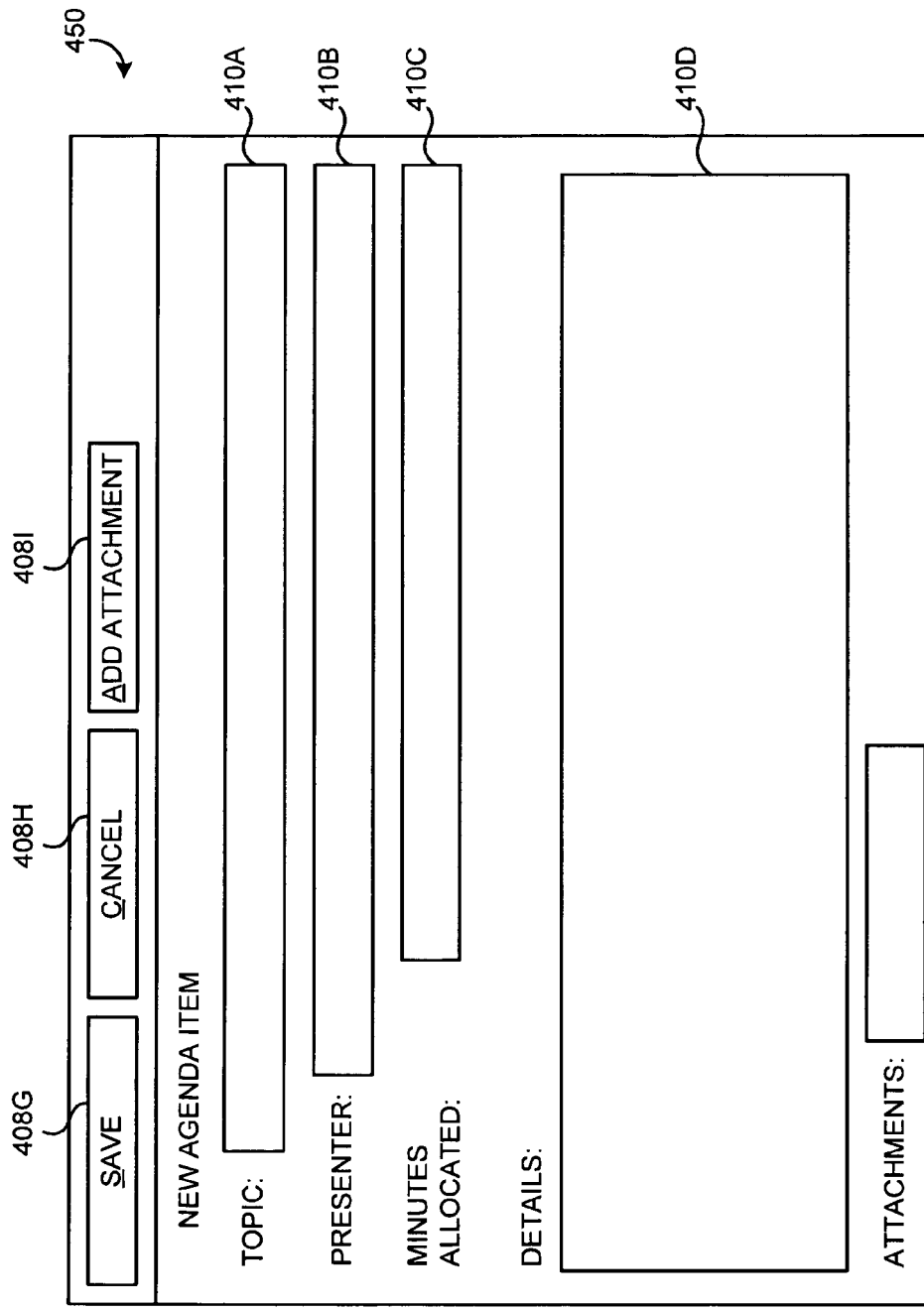

Referring now to FIG. 4B, an illustrative user interface 450 presented by the collaboration program 104 in response to the selection of the user interface control 408A shown in FIG. 4A will be described. As discussed briefly above, selection of the user interface control 408A will cause the user interface 450 to be displayed for creating a new agenda item 404. The user interface 450 shown in FIG. 4B includes the fields 410A-410E. The field 410A may be utilize to specify a topic for the new agenda item, the field 410B may be utilized to specify the presenter for the new agenda item, and the field 410C may be utilized to specify the number of minutes that have been allocated to the new agenda item. The field 410D may be utilized to specify details of the agenda item. The field 410E is utilized to identify attachments that have been added to the new agenda item. When a user has completed creation of the new agenda item, the user interface button 408G may be utilized to save the new agenda item. Alternately, the user interface button 408H may be utilized to cancel the creation of the new agenda item. The user interface control 408I may be utilized to add an attachment to the new agenda item.

Figure 5:
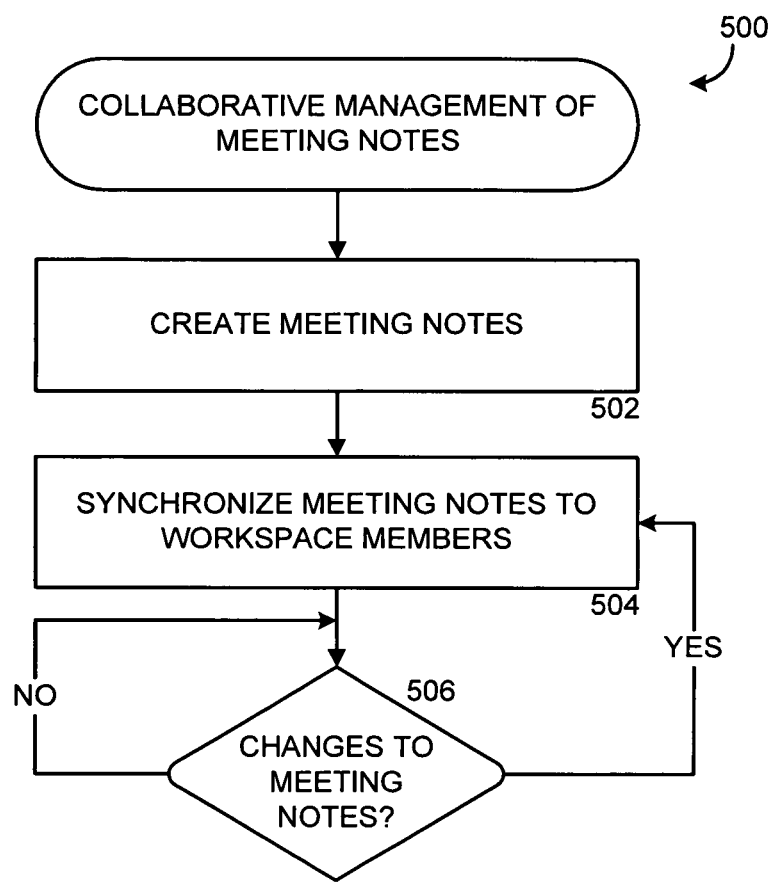
FIG. 5 is a flow diagram showing an illustrative routine provided herein in one embodiment for the collaborative management of meeting notes.

Turning now to FIG. 5, an illustrative routine 500 will be described illustrating aspects of the collaboration program 104 for collaboratively managing activities occurring during a meeting. As discussed above, the collaboration program 104 may operate in conjunction with an online meeting application to provide real-time desktop sharing among the computers 102A-102D during a meeting. Additional functionality that may be provided by the collaboration program 104 during a meeting includes functionality for collaboratively creating meeting notes 210. The routine 500 illustrates one process provided herein for collaboratively creating the meeting notes 210 and synchronizing the meeting notes among the meeting participants.

The routine 500 begins at operation 502, where one of the members of the shared workspace creates the meeting notes 210. It should be appreciated that any or all of the members of the shared workspace 106 may create their own meeting notes, which are then synchronized to the other members of the shared workspace 106. Once the meeting notes have been created, the routine 500 continues to operation 504 where the meeting notes 210 are synchronized to other members of the shared workspace 106.

From operation 504, the routine 500 continues to operation 506, where the collaboration program 104 determines whether there have been any changes to the meeting notes 210. If the meeting notes have been changed, the routine 500 returns to operation 504 where the updated meeting notes 210 are synchronized to the shared workspace 106 of all of the meeting participants. In this manner, any changes to the meeting notes by one of the members of the shared workspace are synchronized to the other members. An illustrative user interface will be described below with reference to FIGS. 6A-6B for creating meeting notes in one embodiment presented herein.

Figure 6A:
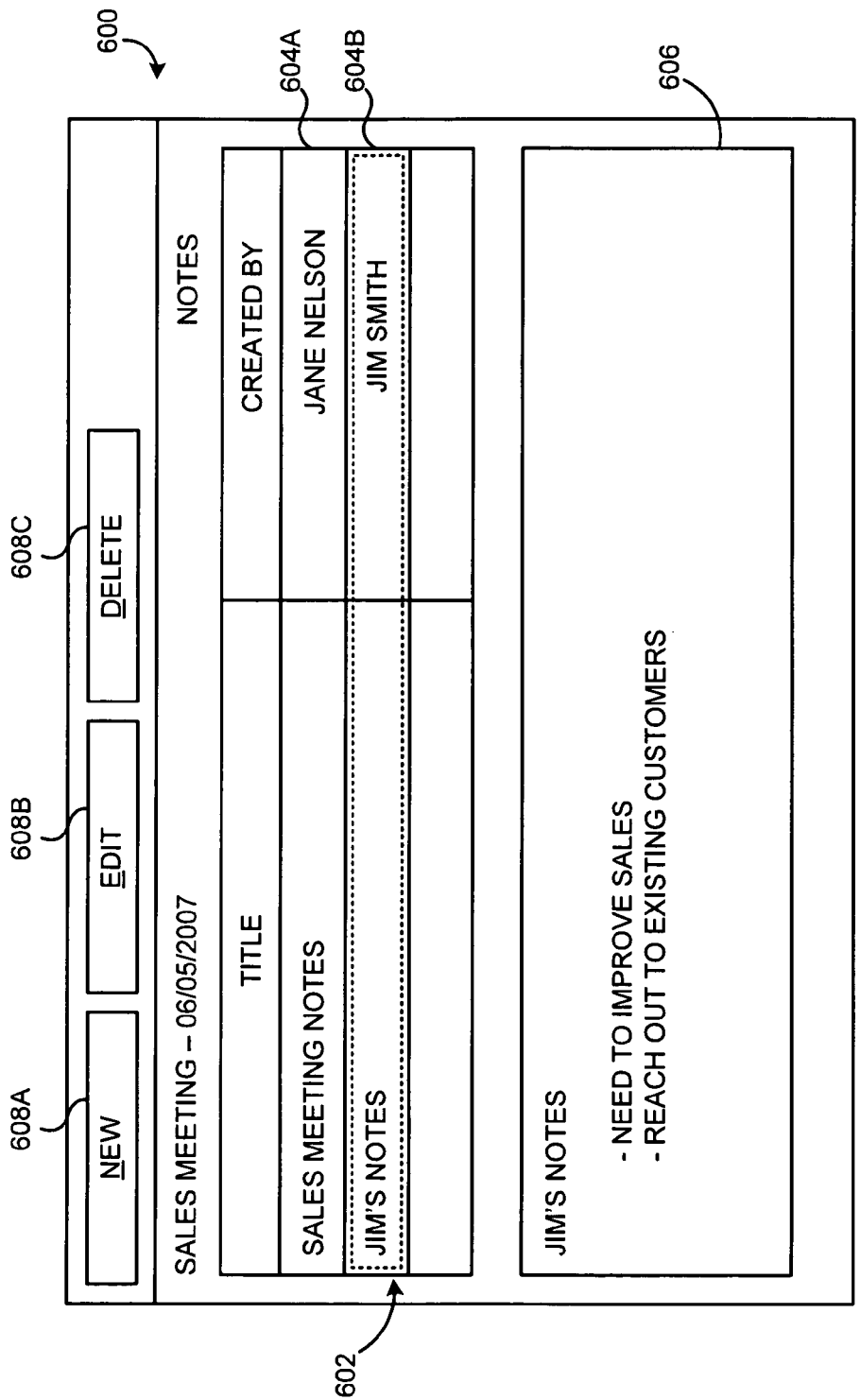
FIGS. 6A-6B are user interface diagrams showing several illustrative user interfaces provided herein in embodiments for collaboratively creating and managing meeting notes.

Referring now to FIG. 6A, an illustrative user interface 600 provided by the collaboration program 104 for the creating meeting notes 210 will be described. As shown in FIG. 6A, the illustrative user interface 600 includes a meeting notes pane 602. The meeting notes pane 602 identifies one or more meeting notes items 604A-604B created by the various members of the shared workspace 106. The user interface 600 also includes a meeting notes detail pane 606 which shows the details of a selected one of the meeting notes items 604A-604B. In the example shown in FIG. 6A, the meeting notes item 604B has been selected, thereby displaying its details in the meeting notes detail pane 606.

The user interface 600 also includes a user interface button 608A for creating new meeting notes, a user interface 608B for editing an existing set of meeting notes, and a user interface button 608C for deleting one of the meeting notes. Additional details regarding the creation of new meeting notes will be described below with reference to FIG. 6B.

Figure 6B:
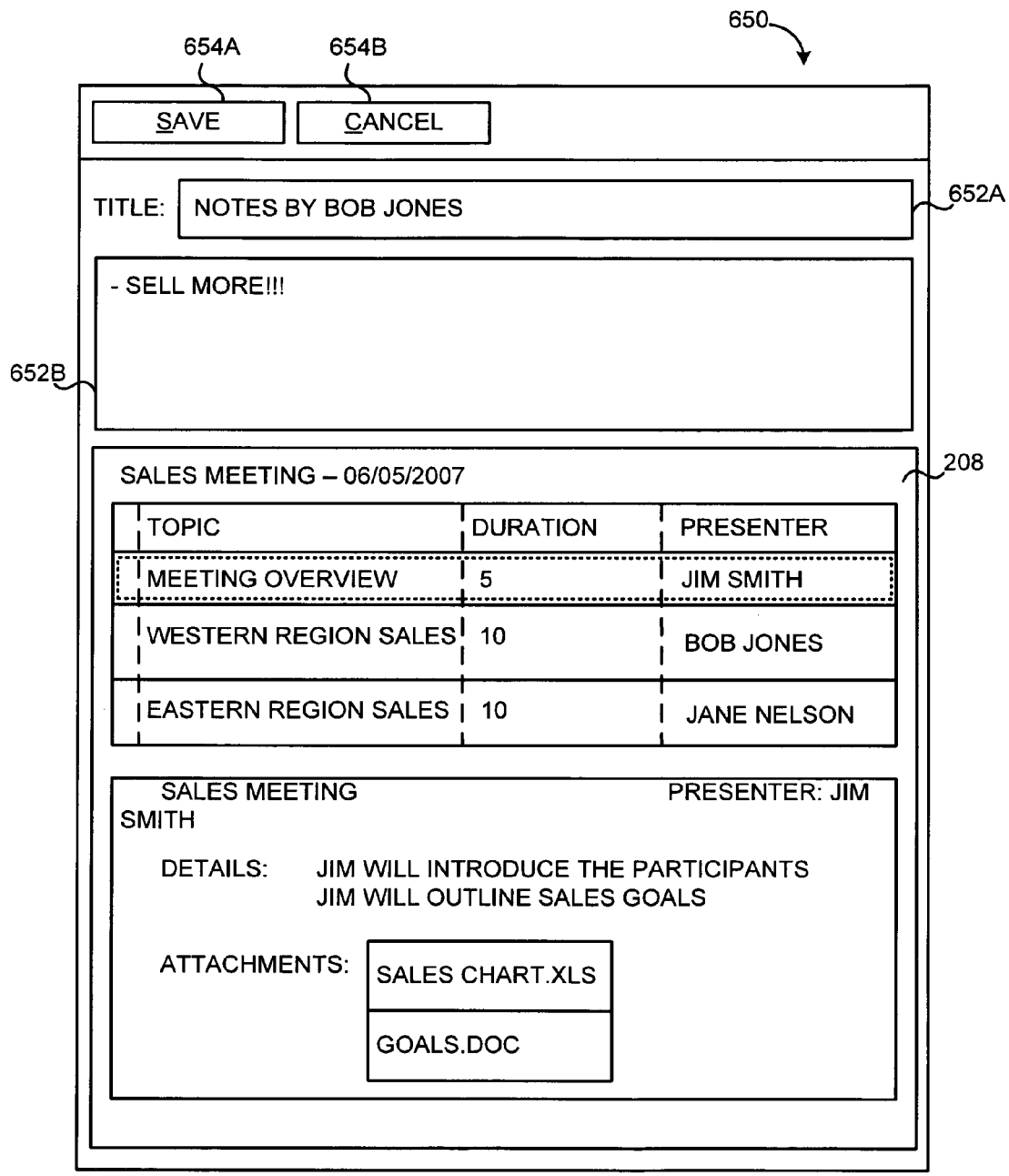

Turning now to FIG. 6B, an illustrative user interface 650 provided by the collaboration program 104 will be described for creating new meeting notes. As discussed above with reference to FIG. 6A, the user interface 650 is displayed by the collaboration program 104 in response to the selection of the user interface button 608A. As illustrated in FIG. 6B, the user interface 650 includes the fields 652A-652B. The field 652A is utilized to specify a title for the meeting notes. The field 652B is utilized to input the actual meeting notes.

It should be appreciated that, according to embodiments, an option may be provided for allowing a user to view the meeting agenda 208 while taking meeting notes. In this manner, a user can reference the agenda as the meeting proceeds and while taking meeting notes. An option may also be provided for attaching the meeting agenda 208 to the newly created meeting notes 210. In the example shown in FIG. 6B, the meeting agenda 208 has been added to the new meeting notes. It should be appreciated that the user interface 650 shown in FIG. 6B may be utilized by a member of the shared workspace 106 to create notes for a meeting during the actual meeting itself. The meeting notes 210 are then synchronized to the other members of the shared workspace 106. If the user would like to save the meeting notes, they may select the user interface control 654A. If the user desires to cancel the creation of the new meeting notes, the user may select the user interface control 654B.

Figure 7:
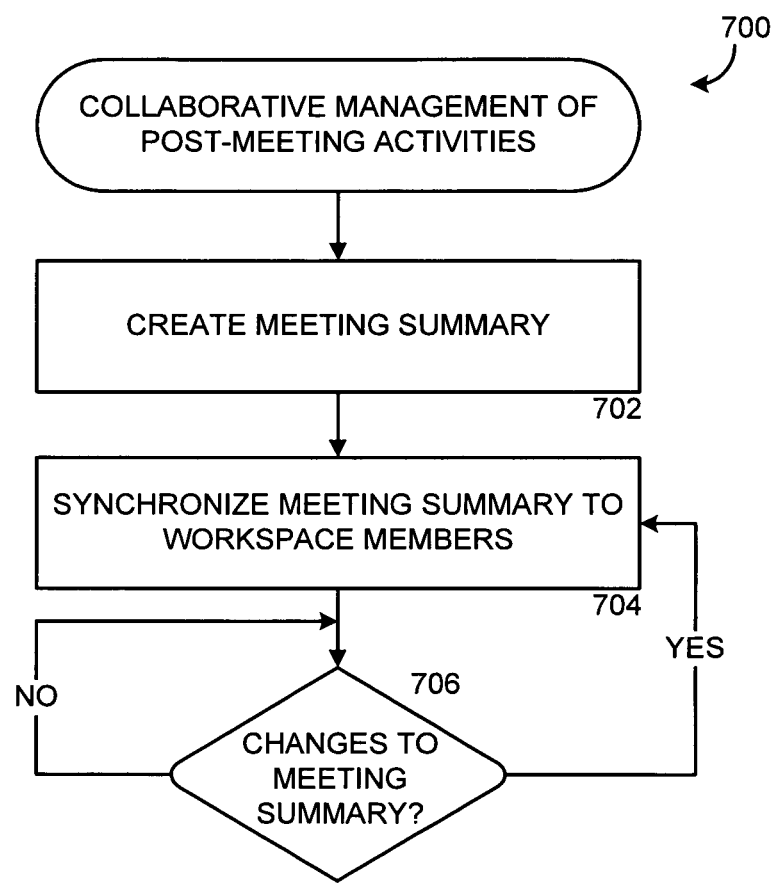
FIG. 7 is a flow diagram showing an illustrative routine provided herein in one embodiment for the collaborative management of post-meeting activities.

Turning now to FIG. 7, an illustrative routine 700 will be described illustrating aspects of the collaboration program 104 for managing post-meeting activities. In particular, according to one implementation, the collaboration program 104 is operative to provide a user interface and associated functionality for creating a meeting summary 212. As discussed briefly above, the meeting 212 provides information summarizing a meeting and may include the meeting agenda 208 and any meeting notes 210 taken by the meeting participants.

The routine 700 begins at operation 702, where a user utilizes the collaboration program 104 to create the meeting summary 212. An illustrative user interface will be provided below with respect to FIGS. 8A-8B for creating the meeting summary 212. Once the meeting summary 212 has been created, the routine 700 continues to operation 704 where the meeting summary 212 is stored in the shared workspace 106. The shared workspace 106 is also synchronized to the members of the shared workspace 106 at operation 704.

From operation 704, the routine 700 continues to operation 706, where the collaboration program 104 determines whether any changes have been made to the meeting summary 212. If changes are detected, the routine 700 returns to operation 704 where the updated meeting summary is synchronized to the shared workspace 106 of each of the members of the shared workspace 106. It should be appreciated that, according to embodiments, the collaboration program 104 also provides functionality for transmitting the meeting summary 212 to individuals that are not members of the shared workspace 106. For instance, in one implementation, the collaboration program 104 includes functionality for sending the meeting summary 212 to any user via an electronic mail message. Other methods of communicating the meeting summary 212 to individuals that are not members of the shared workspace may also be utilized.

Figure 8A:
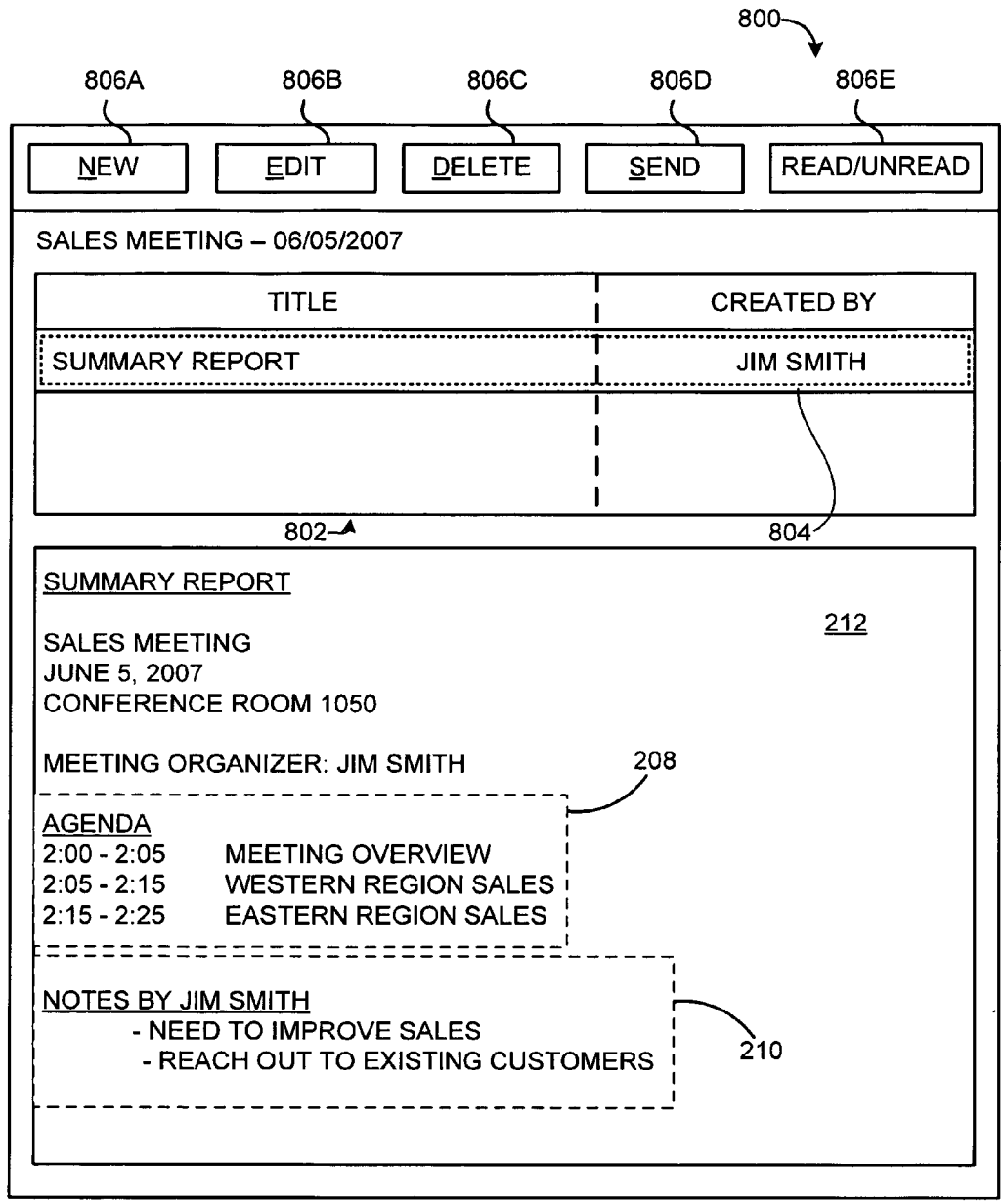
FIGS. 8A-8B are user interface diagrams showing several user interfaces for collaboratively creating and managing meeting summaries in one embodiment presented herein.

Referring now to FIG. 8A, an illustrative user interface 800 provided by the collaboration program 104 for creating a meeting summary 212 will be described. As shown in FIG. 8A, the user interface 800 includes a meeting summary pane 802. The meeting summary pane 802 includes one or more meeting summary items 804 that identify the summaries created by the various members of the shared workspace 106. The user interface 800 also shows the meeting summary 212. As shown in FIG. 8A, the meeting summary 212 identifies the title of the meeting, the date of the meeting, the location of the meeting, and the meeting organizer. Other data regarding the meeting may also be included in the meeting summary 212.

According to implementations, options may be provided to a user to include the meeting agenda 208 in the meeting summary 212. An option may also be provided to include the meeting notes 210 prepared by one or more of the meeting participants in the meeting summary 212. Additional details regarding user interfaces for providing this functionality will be described below with respect to FIG. 8B.

As also shown in FIG. 8A, the user interface 800 also includes the user interface buttons 806A-806E. The user interface control 806A may be selected to create a new meeting summary 212, the user interface control 806B may be utilized to edit an existing meeting summary 212, and the user interface control 806C may be utilized to delete an existing meeting summary 212. The user interface button 806D provides functionality for sending the meeting summary 212 to a user that is not a member of the shared workspace 106 in the manner described above. The user interface button 806E may be used to mark a meeting summary as having been read or unread.

Figure 8B:
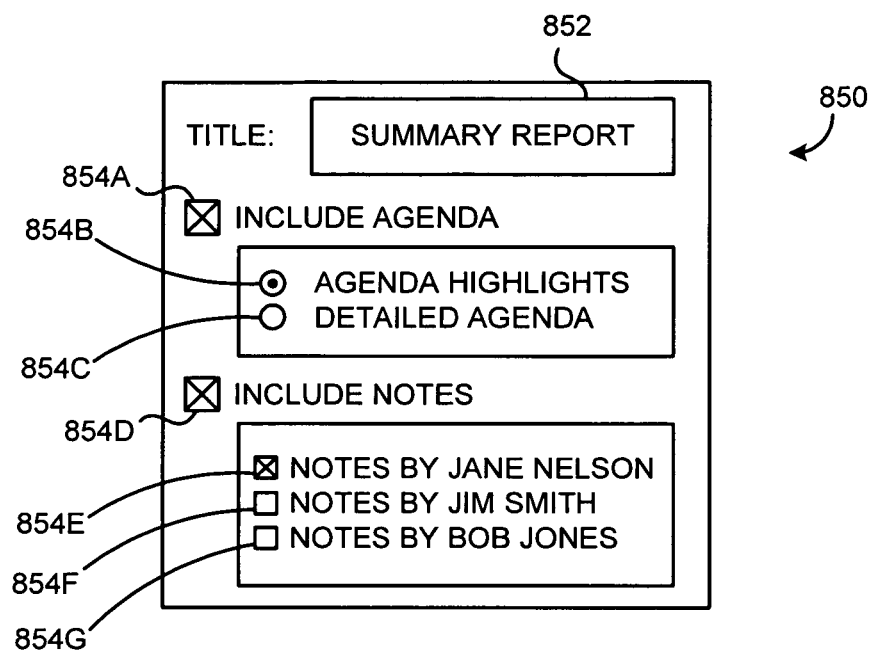

Referring now to FIG. 8B, an illustrative user interface 850 provided by the collaboration program 104 will be described. The user interface 850 is displayed following the selection of the user interface control 806A shown in FIG. 8A and described above. In response to such a selection, the user interface 850 is displayed. The user interface 850 includes user interface controls 854A-854G and a field 852. The field 852 may be utilized to specify a title for the meeting summary 212. When selected, the user interface control 854A will cause the meeting agenda 208 to be included in the meeting summary 212. The user interface controls 854B-854C may be selected to cause either agenda highlights or a detailed agenda, respectively, to be placed within the meeting summary 212.

According to implementations, the meeting notes 210 may also be included in the meeting summary 212 through a selection of the user interface control 854D. Once selected, the user interface controls 854E-854G may also be selected to cause meeting notes 210 prepared by various meeting participants to be included in the meeting summary 212.

Once a user has completed the contents of the user interface 850, the collaboration program 104 is configured to generate the meeting summary 212 based on the specified options. If a user has requested that the meeting summary 212 be transmitted to an individual that is not a member of the shared workspace 106, the collaboration program 104 will cause this to occur. The meeting summary 212 is also stored in the shared workspace 106 and synchronized to the other members of the shared workspace.

It should be appreciated that, according to embodiments, the collaboration program 104 allows any member of the shared workspace 106 to create and make modifications to any meeting agenda 208, meeting notes 210, or meeting summary 212. Any changes to these items are synchronized by the collaboration program 104 to all members of the shared workspace 106. A permission model may also be provided in embodiments that allows a manager of the shared workspace 106 to control the manner in which the members of the shared workspace 106 are allowed to create, modify, and delete the meeting agenda 208, the meeting notes 210, and the meeting summary 212. For instance, a manager may specify that members of the shared workspace 106 be allowed only to modify items that they created, or may specify that members of the shared workspace 106 be permitted to modify any of the items described herein. This permission model may be applied to any data that can be created and stored in the shared workspace 106, such as the meeting entry 206.

Figure 9:
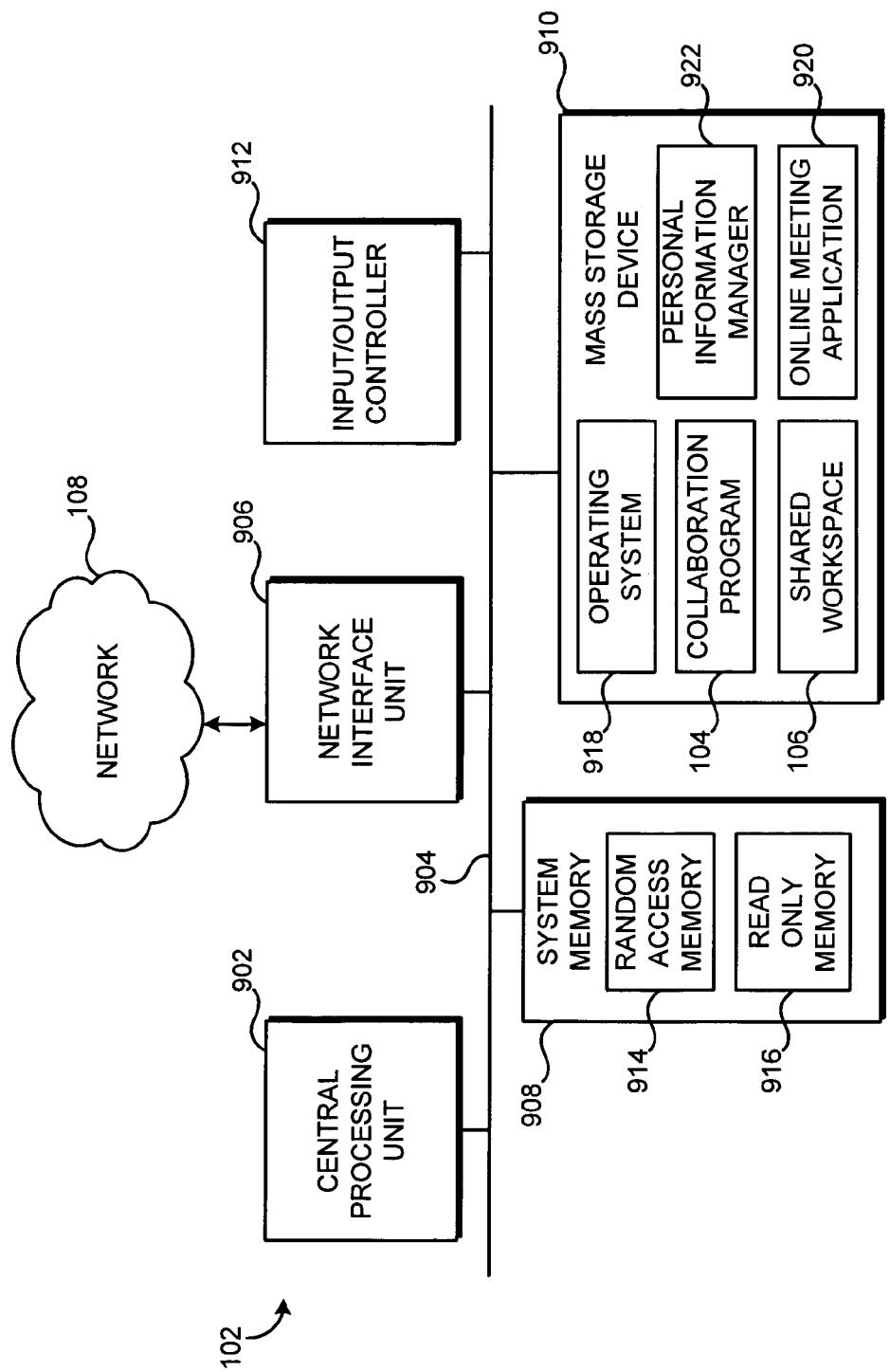
FIG. 9 is a computer architecture diagram showing an illustrative computer hardware and software architecture for a computing system capable of implementing aspects of the embodiments presented herein.

FIG. 9 shows an illustrative computer architecture for a computer 102 capable of executing the software components described herein for collaborative management of activities occurring during the lifecycle of a meeting in the manner presented above. The computer architecture shown in FIG. 9 illustrates a conventional desktop, laptop, or server computer and may be utilized to execute any aspects of the software components presented herein described as executing on the computers 102A-102D shown in FIG. 1 and described above.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 102, such as during startup, is stored in the ROM 916. The computer 102 further includes a mass storage device 910 for storing an operating system 918, application programs, and other program modules, which are described in greater detail herein.

The mass storage device 910 is connected to the CPU 902 through a mass storage controller (not shown) connected to the bus 904. The mass storage device 910 and its associated computer-readable media provide non-volatile storage for the computer 102. Although the description of computer-readable media contained herein refers to a mass storage device, such as a hard disk or CD-ROM drive, it should be appreciated by those skilled in the art that computer-readable media can be any available computer storage media that can be accessed by the computer 102.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 102.

According to various embodiments, the computer 102 may operate in a networked environment using logical connections to remote computers through a network such as the network 108. The computer 102 may connect to the network 108 through a network interface unit 906 connected to the bus 904. It should be appreciated that the network interface unit 906 may also be utilized to connect to other types of networks and remote computer systems. The computer 102 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 102, including an operating system 918 suitable for controlling the operation of a networked desktop, laptop, or server computer. The mass storage device 910 and RAM 914 may also store one or more program modules. In particular, the mass storage device 910 and the RAM 914 may store the collaboration program 104, the shared workspace 106, the online meeting application 920, and the personal information manager 922. As discussed briefly above, the collaboration program 104 may utilize features of the online meeting application 920 to enable real-time desktop sharing and may integrate with calendaring features provided by the personal information manager 922. Details regarding other aspects of the operation of the collaboration program 104 and the shared workspace 106 were described in detail above with respect to FIGS. 1-8B. The mass storage device 910 and the RAM 914 may also store other types of program modules.

Based on the foregoing, it should be appreciated that technologies for collaborative management of activities occurring during the lifecycle of a meeting are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
   providing an agenda interface configured to allow an originating meeting participant to generate an agenda for a meeting;
   locally storing the agenda in a workspace in a computer associated with the originating meeting participant, the computer having a copy of a collaboration program facilitating the workspace;
   transmitting a copy of the workspace to computers used by other meeting participants of the meeting, the transmitted copies of the workspace being locally stored in the computers used by the other meeting participants, which individually have a copy of the collaboration program;

providing a summary interface configured to allow the originating meeting participant to generate a summary of the meeting;

storing the summary of the meeting in the workspace in the computer used by the originating meeting participant;

transmitting a copy of the summary of the meeting in the workplace to the computers used by the other meeting participants of the meeting;

detecting, by the collaboration program, a change in at least one of the copies of the summary of the meeting locally stored in the computers used by the other meeting participants; and automatically synchronizing, by the collaboration program, the detected change in the summary of the meeting to the copies of the workspace locally stored in the computers used by the originating meeting participant and the other meeting participants.

2. The method of claim 1, further comprising allowing, via the agenda interface, the other meeting participants to create one or more agenda items, to edit the agenda items, and to delete the agenda items.

3. The method of claim 2, further comprising allowing, via the agenda interface, the originating meeting participant to add one or more attachments to the agenda items.

4. The method of claim 2, further comprising:
providing a notes interface configured to allow the originating meeting participant to create notes related to the meeting; and
storing the notes in the workspace in the computer associated with the originating meeting participant.

5. The method of claim 4, wherein the notes interface is configured to allow the agenda to be added to the notes.

6. The method of claim 1, further comprising:
providing, through the summary interface, controls to edit and delete an existing meeting summary, and to send the existing meeting summary to a destination associated with a non-member of the workspace.

7. The method of claim 6, further comprising allowing, via the summary interface, the agenda and the notes to be added to the summary of the meeting.

8. A computer-implemented method, comprising:
creating a workspace and an invitation for a meeting on a computer used by a user, the workspace containing a document and/or content and being locally stored on the computer having a copy of a collaboration program facilitating the workspace;
transmitting the generated invitation for the meeting to additional computers used by other users via a computer network;
receiving a response to accept the transmitted invitation from at least one of the additional computers used by at least one of the other users;
sending a copy of the workspace to be locally stored in the at least one of the additional computers used by at least one of the other users in response to receiving the response to accept the transmitted invitation, the at least one of the additional computers individually having a copy of the collaboration program;
detecting, by the collaboration program, a change in the document and/or content of the workspace locally stored on the at least one of the additional computers; and in response to the detected change, automatically synchronizing, by the collaboration program, the copies of the workspace locally stored in the computer used by the user and the at least one of the additional computers with the detected change.

9. The computer-implemented method of claim 8, further comprising:
providing an agenda interface on the computer associated with the user;
receiving an agenda for the meeting from the user via the agenda interface;
storing the received agenda in the workspace locally stored on the computer associated with the user;
wherein detecting the change includes detecting the agenda stored in the workspace; and
wherein automatically synchronizing the detected change includes automatically synchronizing the agenda in the workspace on the computer used by the user with the copy of the workspace locally stored in the at least one of the additional computers.

10. The computer-implemented method of claim 8 wherein the agenda includes an agenda item, and wherein the method further includes:
receiving change data from the at least one of the additional computers, the change data representing one or more agenda items created, edited, and/or deleted by the at least one of the other users; and
synchronizing the agenda in the workspace based on the received change data.

11. The computer-implemented method of claim 8 wherein the agenda includes an agenda item, and wherein the method further includes:
receiving change data from the at least one of the additional computers, the change data representing one or more attachments to the agenda item; and
synchronizing the agenda in the workspace based on the received change data.

12. The computer-implemented method of claim 8, further comprising:
providing a notes interface on the computer associated with the user;
receiving a note from the user via the notes interface;
storing the received note in the workspace locally stored on the computer associated with the user;
wherein detecting the change includes detecting the note stored in the workspace; and
wherein synchronizing the detected change includes synchronizing the note in the workspace on the computer associated with the user with the copy of the workspace locally stored in the at least one of the additional computers.

13. The computer-implemented method of claim 8, further comprising:
receiving change data from the at least one of the additional computers, the change data representing one or more additional notes for the meeting; and
synchronizing the workspace locally stored on the computer associated with the user based on the received change data.

14. The computer-implemented method of claim 8, further comprising:
providing a summary interface on the computer associated with the user;
receiving a meeting summary from the user via the summary interface;
storing the received meeting summary in the workspace locally stored on the computer associated with the user;

wherein detecting the change includes detecting the meeting summary stored in the workspace; and
wherein synchronizing the detected change includes synchronizing the meeting summary in the workspace on the computer associated with the user with the copy of the workspace locally stored in the at least one of the additional computers.

15. The computer-implemented method of claim 8, further comprising:
receiving change data from the at least one of the additional computers, the change data representing a change to the meeting summary; and
synchronizing the workspace locally stored on the computer associated with the user based on the received change data.

16. The computer-implemented method of claim 8 wherein synchronizing the detected change includes synchronizing the detected change following a peer-to-peer topology or is assisted by a server computer.

17. A computer system having a processor and a memory containing instructions, when executed by the processor, causing the processor to perform a method comprising:
receiving a request from a user for a meeting, the request including a meeting time and other users invited to the meeting;
creating a meeting entry in a workspace on a computer used by the user, the meeting entry includes at least one of a meeting agenda, a meeting note, or a meeting summary, wherein the computer has a copy of a collaboration program facilitating the workspace;
generating a meeting invitation based on the received request from the user;
transmitting the generated meeting invitation to additional computers used by the other users via a computer network, the additional computers individually having a copy of the collaboration program;
receiving responses to accept the meeting invitation from at least some of the additional computers used by at least some of the other users;
sending a copy of the workspace to be locally stored in the at least some of the additional computers used by the at least some of the other users who accept the meeting invitation;
detecting, by the collaboration program, a change in at least one of the meeting agenda, meeting note, or meeting summary in the workspace locally stored on the at least some of the additional computers used by the at least some of the other users who accept the meeting invitation;
in response to the detected change, automatically synchronizing, by the collaboration program, the copies of the workspace locally stored in the computer used by the user and the other additional computes of the at least some of the additional computers with the detected change;
receiving change data representing a change in at least one of the meeting agenda, meeting note, or meeting summary; and
in response to the received change data, automatically synchronizing, by the collaboration program, at least one of the meeting agenda, meeting note, or meeting summary stored in the workspace locally stored in the computer used by the user with the received change data.

18. The computer system of claim 17 wherein creating the meeting entry includes:
providing an agenda interface on the computer associated with the user;
receiving the meeting agenda from the user via the agenda interface; and
storing the received meeting agenda in the workspace locally stored on the computer associated with the user.

19. The computer system of claim 17 wherein at least one of synchronizing the copies of the workspace or synchronizing at least one of the meeting agenda, meeting note, or meeting summary is following a peer-to-peer topology or is assisted by a server computer on the computer network.

* * * * *